(12) United States Patent
Campbell (10) Patent No.: US 9,243,200 B2
(45) Date of Patent: Jan. 26, 2016

(54) METHOD AND APPARATUS FOR HYDROGEN SULPHIDE REMOVAL

(71) Applicant: Almont Emissions Inc., Calgary (CA)

(72) Inventor: Bryan Campbell, Calgary (CA)

(73) Assignee: Almont Emissions Inc., Calgary (CA)

( * ) Notice: Subject to any disclaimer, the term of this patent is extended or adjusted under 35 U.S.C. 154(b) by 175 days.

(21) Appl. No.: 14/093,371

(22) Filed: Nov. 29, 2013

(65) Prior Publication Data

US 2014/0154161 A1    Jun. 5, 2014

Related U.S. Application Data

(60) Provisional application No. 61/731,691, filed on Nov. 30, 2012.

(51) Int. Cl.
| | | |
|---|---|---|
| *C01B 17/05* | (2006.01) | |
| *B01D 53/78* | (2006.01) | |
| *B01D 53/79* | (2006.01) | |
| *C10L 3/10* | (2006.01) | |
| *B01D 53/14* | (2006.01) | |
| *B01D 53/18* | (2006.01) | |
| *B01D 53/52* | (2006.01) | |

(52) U.S. Cl.
CPC ............. *C10L 3/103* (2013.01); *B01D 53/1468* (2013.01); *B01D 53/18* (2013.01); *B01D 53/52* (2013.01); *B01D 53/1487* (2013.01); *B01D 2252/20415* (2013.01); *B01D 2252/20436* (2013.01); *B01D 2252/20452* (2013.01); *B01D 2252/20457* (2013.01); *B01D 2252/20489* (2013.01); *B01D 2252/504* (2013.01); *B01D 2256/245* (2013.01); *B01D 2257/304* (2013.01); *B01D 2257/708* (2013.01); *B01D 2257/90* (2013.01)

(58) Field of Classification Search
CPC ......... C01B 17/05; B01D 53/78; B01D 53/79
See application file for complete search history.

(56) References Cited

U.S. PATENT DOCUMENTS

| | | | | |
|---|---|---|---|---|
| 4,525,338 | A * | 6/1985 | Klee, Jr. ................... | 423/576.2 |
| 4,710,305 | A * | 12/1987 | Allison et al. ............. | 210/747.1 |
| 5,215,728 | A * | 6/1993 | McManus .................. | 423/220 |
| 5,302,361 | A * | 4/1994 | Nagl .......................... | 423/220 |
| 7,081,233 | B2 | 7/2006 | Louie | |
| 7,144,555 | B1 | 12/2006 | Squires et al. | |
| 2013/0004393 | A1 * | 1/2013 | Menendez et al. ........... | 423/228 |

* cited by examiner

*Primary Examiner* — Timothy Vanoy
(74) *Attorney, Agent, or Firm* — Goodwin Law; Sean W Goodwin (57) ABSTRACT

A compact treatment apparatus and methodology is provided for scavenging at least $H_2S$ from an acid gas stream. The vessel is charged with a batch of an aqueous solution of $H_2S$ scavenging treatment liquid. Acid gas is discharged from a sparge bar fit with graduated openings, either graduated from small to large or from a few to many and spaced therealong, for distributed discharge into the treatment liquid. The acid gas percolates up through the liquid and into a vessel headspace, the gas being scrubbed of $H_2S$ for producing a treated discharge gas. The treatment solution can be an aqueous solution of incorporating one of several active $H_2S$ scavenger ingredients including amine-aldehyde compositions or triazines.

12 Claims, 10 Drawing Sheets

METHOD AND APPARATUS FOR HYDROGEN SULPHIDE REMOVAL

CROSS REFERENCE TO RELATED APPLICATION

This application claims the benefit of U.S. Provisional Patent application Ser. No. 61/731,691, filed Nov. 30, 2012, the entirety of which is incorporated herein by reference.

FIELD

A scrubbers and methodology is provided for removing hydrogen sulphide and volatile organics from a sour gas stream. In particular, sour gas is introduced into a compact vessel, optionally removing moisture, for distribution into an aqueous hydrogen sulphide scavenging solution.

BACKGROUND

In response to an inefficient and environmentally damaging practice of flaring sour emissions, scrubbers have been developed for removing the problematic components for reducing or eliminating the need to store and transfer corrosive and toxic sour material. Scavengers or scrubbers are known for removing components within acid gases including hydrogen sulphide and volatile organic carbons (VOC's). In particular, scrubbers are used in the treatment of gas streams emanating from produced or stored petroleum, or from produced natural gas stream or from other sources.

Current processes include amine processes, a variety of towers and various ammonia and iron-related chemical reactions. Applicant has found reluctance in the industry to adopt such process and equipment either due to the high capital cost and poor economics when applied at low gas rates or their unwieldy and inefficient nature, reducing the applicability to marginal gas wells.

There is a continued need for an apparatus be developed that is both compact and portable allowing effective installation and operation at the source of the sour gas venting or production. Such a method may allow the production of low volume gas wells previously deemed uneconomical.

SUMMARY

Acid gas and VOC removal is efficiently and effectively accomplished by contacting the gas stream with an aqueous solution of an $H_2S$ scavenging active ingredient purposefully designed to react substantially immediately and selectively with hydrogen sulphide ($H_2S$) at about standard atmospheric pressure and at ambient temperatures. Apparatus is disclosed herein for treatment of sour gas at variable rates ranging from about 400 to about 12,000 cubic feet per minute.

In an embodiment, apparatus is provided comprising closed reaction vessel having a gas inlet and gas outlet, the gas inlet fluidly connected to at least one sparge bar submerged in an engineered $H_2S$ scavenging solution stored in the vessel, each sparge bar having outlets for substantially distributed discharge of the feedstream into the solution. The sparge bar outlets can be graduated, either graduated from small to large or from a few to many outlets, therealong so as to allow a distributed discharge of gas even as the pressure along the bar diminishes. The gas stream is distributed substantially equally along the sparge bar and into the $H_2S$ scavenging solution for removal of at least the $H_2S$ to form a treated discharge stream In other embodiments the vessel is divided into a first moisture knockout chamber and a second treatment chamber containing the engineered $H_2S$ scavenging solution such as an amine-aldehyde based compound or triazine-based solution using primary and secondary amines as catalysts. In one embodiment, the active ingredient in an a $H_2S$ scavenging is a hexahydro-1 3 5-tris(2-hydroxyethyl)-s-triazine in water, or methanol or both.

In embodiments, the vessel is a compact, horizontally-extending vessel sized for road transport. A purified or treated discharge stream gas outlet, connected to a headspace above the solution, can in one embodiment comprise a vent stack that can be pivotally connected for movement between a prone transport position and an upright stack position, and in others provide the discharge to subsequent scrubbers 10 downstream equipment. In production operations, the gas outlet can be piped for discharge to downstream equipment such as fuel or gas production lines.

In an aspect, a method for removing $H_2S$ from a sour feedstream comprises partially filling the vessel to establish a liquid level of a engineered chemical solution of an active H2S scavenging ingredient in water that selectively reacts with the sour components, introducing the acid gas through the gas inlet and through the sparge bar in the solution which disperses the feedstream throughout and recovering the purified gas stream from the headspace. The headspace or gas outlet can be monitored with a standard gas tech monitor or personal gas detector for evidencing exhaustion of the chemical solution.

DETAILED DESCRIPTION

As shown in FIG. 1 and FIGS. 2A to 2C, in a first embodiment, a scrubber 10 is shown comprising a horizontally-extending treatment vessel 12 for storing a liquid treatment solution 14. The vessel 12 lies lengthwise such that its longitudinal axis is substantially horizontal. The vessel is compact and readily transported to site. The treatment solution 14 partially fills the vessel 12 forming a lower treatment portion 16 having a liquid level and a headspace portion 18. One or more sparge bars 20 extend along a lower portion of the vessel 12 from about a first end 22 of the vessel to about a second end 24 of the vessel. Each sparge bar 20 has an inlet end 26 and a plurality of outlets 28 positioned therealong between the inlet end 26 and a distal end 30. The plurality of outlets are downward facing for maximizing gas and liquid contact in the lower treatment portion 16. A gas outlet 32 is positioned at an upper end of the vessel's headspace for discharging a treated discharge stream. The gas outlet 32 can be located at the second end 24 of the vessel, typically spaced from the inlet end 26 of the sparge bar 20.

Figure 2A:
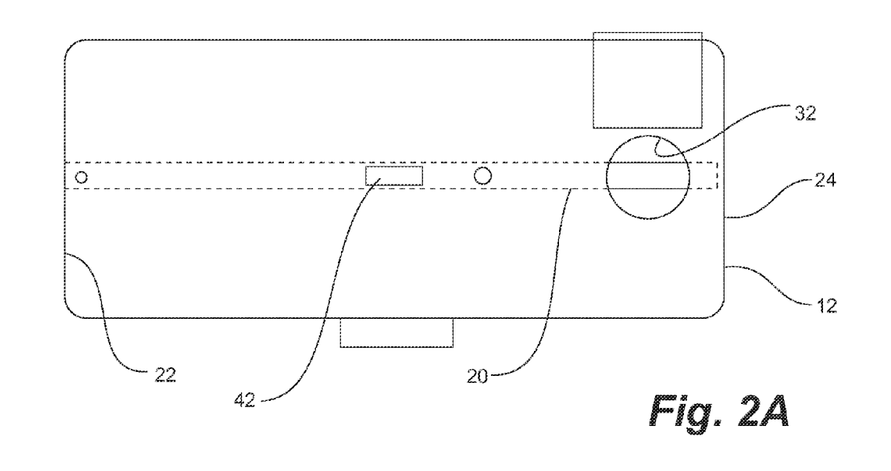
FIGS. 2A, 2B and 2C are top, side and a cross-section end view of the scrubber according to FIG. 1.
Figure 2B:
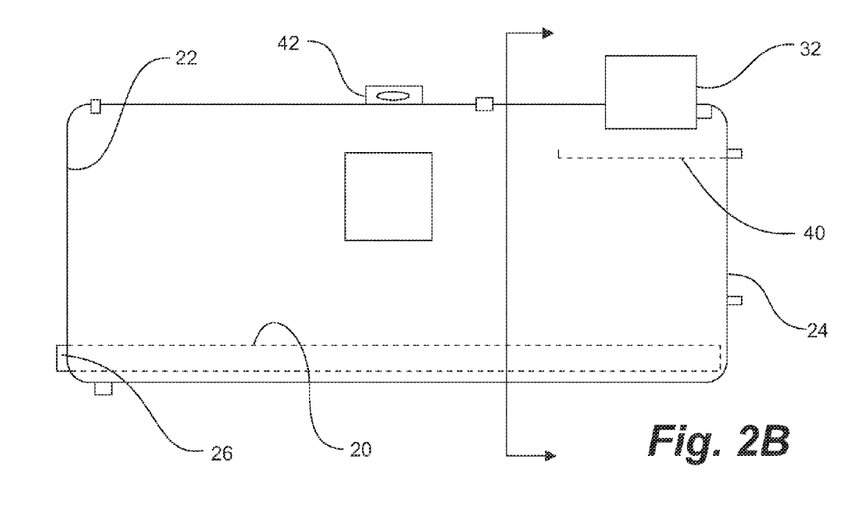
Figure 2C:
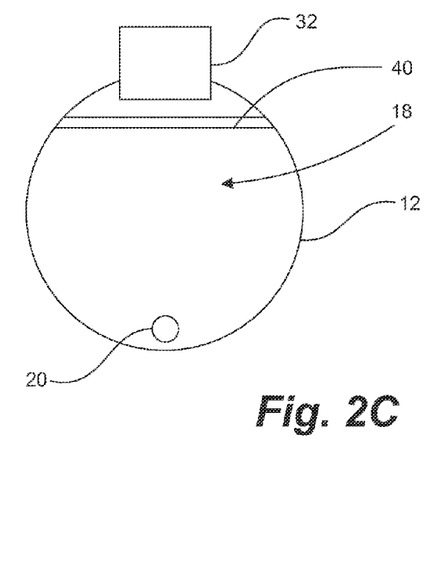

As shown in the scrubber embodiment of FIGS. 2A to 2B, the vessel 12 is cylindrical, the first and second ends 22,24 being closed with substantially flat end walls. One sparge bar 20 is shown comprising a tube or pipe having the inlet end 26 extending through the vessel's first end 22 for connection to a source of the sour gas.

The sparge bar 20 extends to the distal end 30 adjacent the second end 24 of the vessel 12. The gas outlet 32 is located at a top of the vessel 12 adjacent the second end 24. A baffle and drip tray 40 is located below and spaced from the gas outlet 32. The drip tray 40 can extend across a chord of the vessel 12, sealed along three sides and open to a middle of the headspace portion 18. Any solution 14 carried over to the gas outlet 32 and coalescing and dripping back down to the headspace 18 can be collected in the drip tray 40, minimizing re-entrainment, for return to the lower treatment portion or removal.

The vessel 12 is sized for transport and on-site portability and can include a generally centrally located lifting plate 42 having an eye or clevis connection for ease of picking and placement. The lifting plate 42 is located at about the vessel's center of gravity.

Figures 2D, 2E:
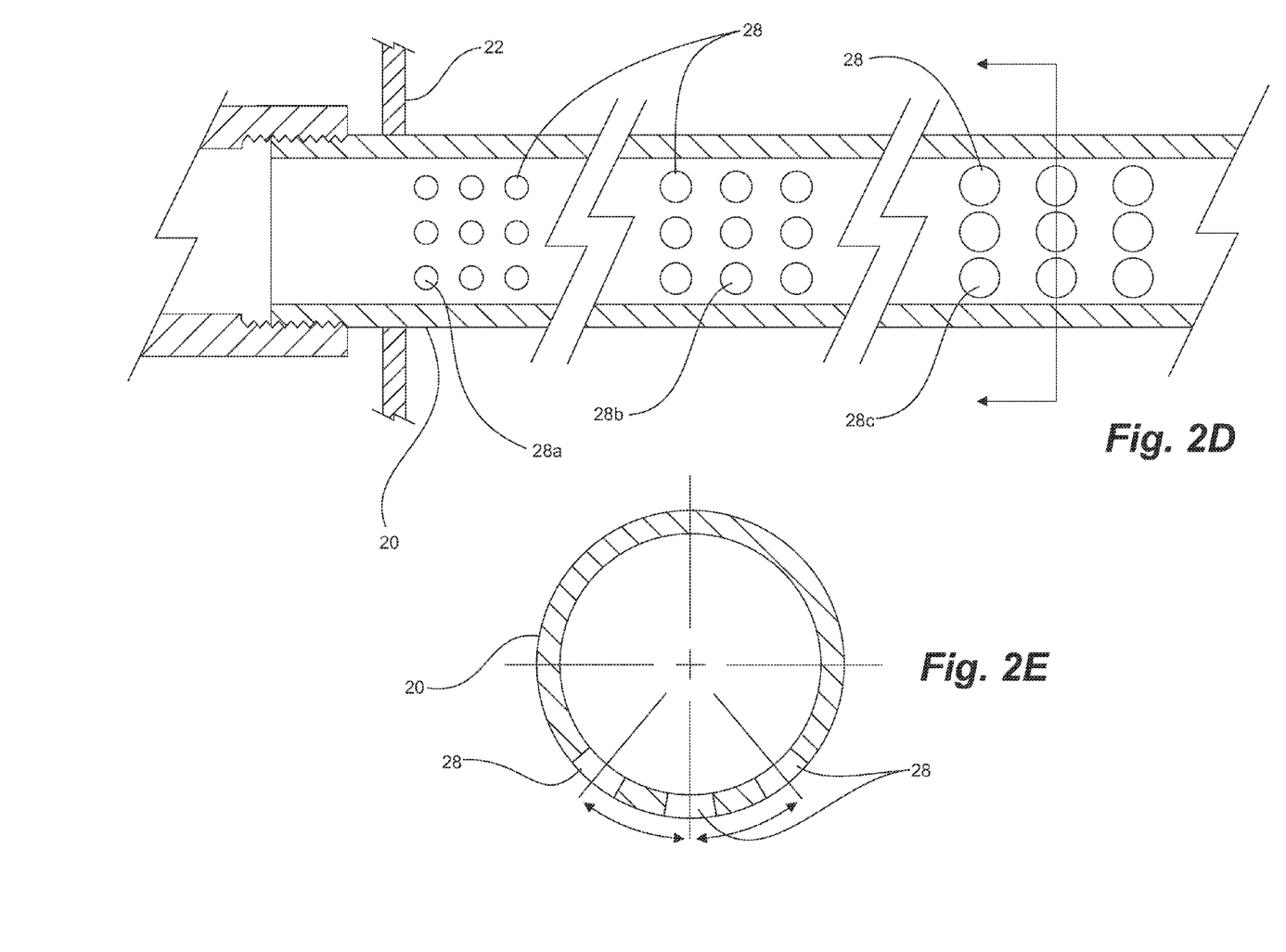
FIG. 2D is a plan, cross-sectional view of a sparge bar having graduated sized outlets forked therein.
FIG. 2E is a cross-sectional view along a longitudinal axis of the sparge bar according to FIG. 2D.
Figure 2F:
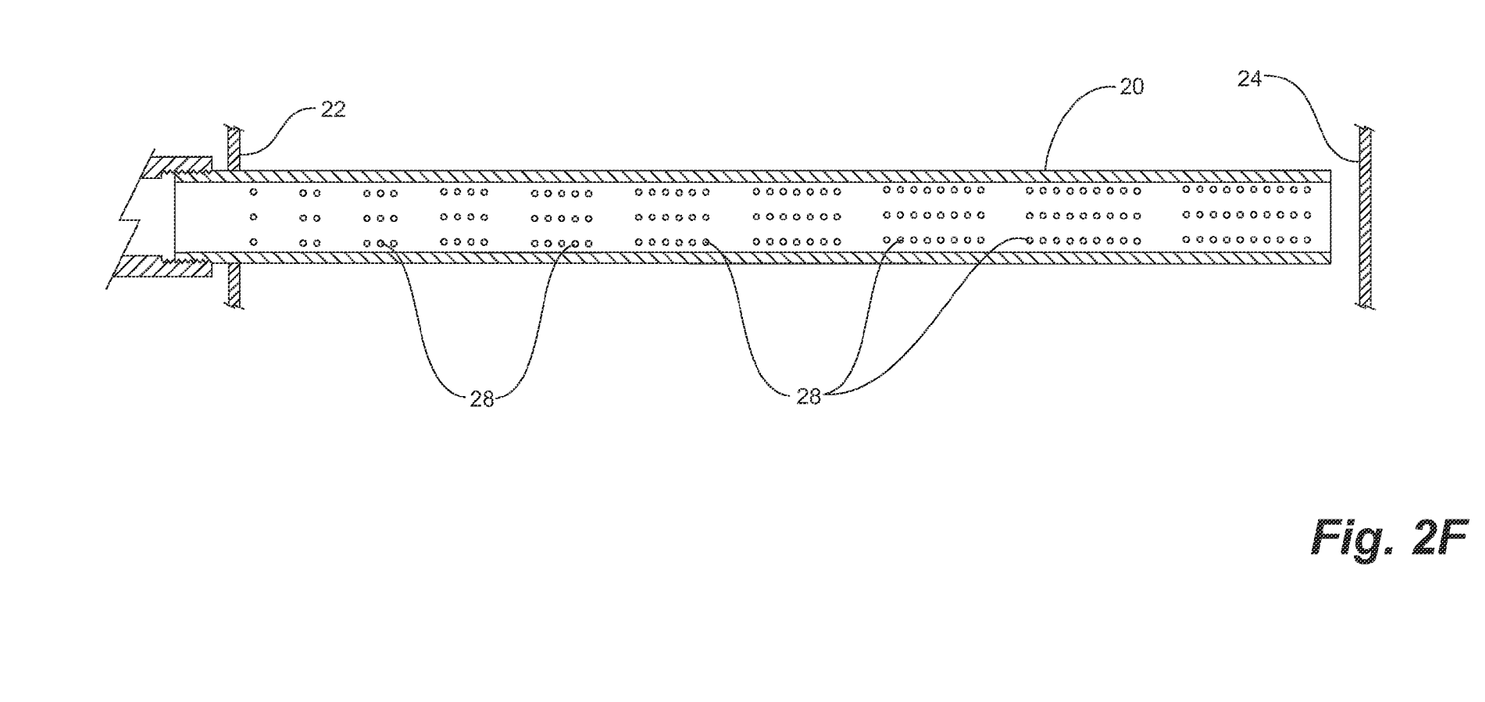
FIG. 2F is a plan, cross-sectional view of an alternate sparge bar having graduated groupings of like-size openings.

As shown in FIGS. 2D and 2E, the each of the one or more sparge bars 20 can comprise a tubular having a longitudinal axis, the sizing of the outlets 28 being graduated therealong, the outlet area of which increases a first small upstream area to a larger downstream area as the sour gas feedstream is incrementally discharged into the solution and the pressure of the feedstream drops. As the gas is discharged along the sparge bar, the pressure drops; less and less gas being available for discharge from latter outlets and at lower and lower pressures. Therefore the provided outlet area for successive outlets is configured to be larger and larger so as to maintain an even volumetric flow rate therealong. The graduated discharge assists in providing an even volume distribution of gas into the treatment solution within the vessel regardless of the reduction of pressure along the sparger. Examples of graduated discharges include using outlets of incrementally increasing diameter as shown in FIG. 2D. Three groups of gas outlets are spaced along the sparge bar. With reference to FIG. 2E, the gas outlets can be arranged threes, directed towards the bottom of the tank, the three outlets being spaced angularly about one quarter of the lower circumference.

Figure 1:
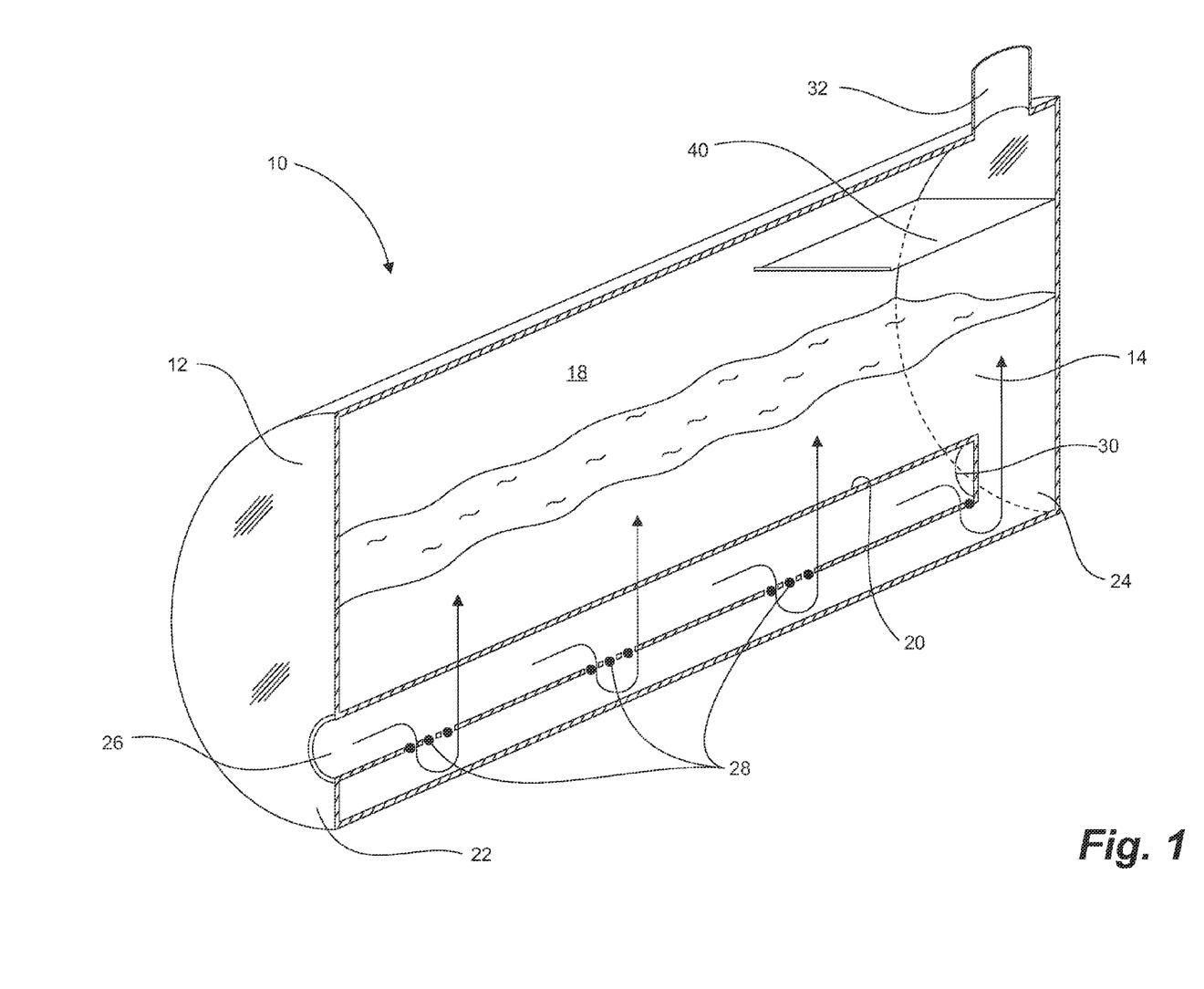
FIG. 1 is a perspective cross-sectional view of an $H_2S$ scrubber vessel according to one embodiment.

In detail and with reference to FIG. 2D, the outlets 28 are shown placed in three main groups at intervals along the length of the bar 20, the number and spacing of the groups dependent upon the process conditions. The respective outlets 28a,28b,28c of each group of outlets 28 has a larger discharge area than the previous group. The diameter of the outlets gradually increase over the length of the at least one sparge bar, where the smallest holes 28a start at the proximal or inlet end and increase toward the distal end. Of the three groupings of outlets 28 as one moves from the sparge bar's inlet end 26 to the distal end 30, there is a first group of small outlets 28a closest to the inlet end 26, an intermediate group of medium outlets 28b, and there is a third grouping of larger outlets 28c towards the distal end 30. As shown in FIGS. 1 and 2D, the outlets 28 are oriented downwards for maximal contact with the treatment solution 14 upon exit. Of course, the number of groups and the sizing is a matter of design dependent upon factors including the sour gas inlet pressure, the flow rate, and the solution liquid head or backpressure. In another embodiment of FIG. 2E, one can provide ever more dense or concentrated spaced groupings of like-sized outlets 28 for providing the increased outlet area as one moves from the sparge bar's inlet end 26 to the distal end 30. Further one can use a combination of outlet size and numbers of outlets. The graduated discharge increases the effectiveness of the diminishing gas distribution as compared to using an even distribution of same-sized outlets all along the sparge bar 20. In an embodiment, the particular form of the groupings can be a result of manufacturing efficiency to minimize handling of the bar during drilling.

A Hydrogen Sulphide Scavenger (HSS) forms the active chemical or ingredient in the engineered treatment $H_2S$ Scavenger solution to chemically react with contaminants in the acid gas feedstream, including $H_2S$ and volatile organic carbons, to eliminate sulphides, aromatic hydrocarbons and basic noxious odors in the treated discharge stream.

In embodiments, the active ingredient is an amine-based compositions for sulfur scavenging are employed. The compositions are liquid and will form aqueous solutions for use in the disclosed systems for scrubbing gas streams.

In an embodiment, the HSS active ingredient selected from the group of triazine compositions are applicable such as those commercially available HSS such as Sulfa Clear® 8411C, is used, Sulfa Clear® being a registered trademark of Clearwater, Inc. and available from Weatherford International Ltd. The constituents of the HSS are set forth in U.S. Pat. No. 5,128,049 to Clearwater International, L.L.C. according to the patent disclosure, basically, the HSS is selected from the group consisting of: hexahydro-1,3,5-tris (2-hydroxyethyl)-s-Triazine; tris(hydroxylmethyl)nitromethane; a mixture of 4-(2-nitrobutyl)morpholine and 4,4'-(2-ethyl-2-nitrotrimethylene)-dimorpholine; a mixture of 4,4-dimethyloxazolidine and 3,4,4-trimethyloxazolidine; hexahydro-1,3,5-triethyl-s-triazine; a mixture of sodium 2-pyridinethiol-1-oxide and hexahydro-1,3,5-tris(2-hydroxyethyl)-s-triazine; 2,2-dibromo-3-nitrilopropionamide; methanol [[[2-(dihydro-5-methyl-3(2H)-oxazolyl)-1-methylethyoxy]methoxy]methoxy]; 2[(hydroxymethyl)amino] ethanol; 2[(hydroxymethyl)amino]-2-methyl-propanol; sodium dichloro-s-triazinetrione dihydrate; or 1-(hydroxymethyl)-5,5 dimethylhydantoin.

In another embodiment, the HSS active ingredient comprises a chemical derived from the reaction of aldehyde and amines some of which also present as including a triazine, others not having triazine. One method for producing the HSS active chemical is as set forth in U.S. Pat. No. 8,092,431 to Falana et al. and assigned to Clearwater International LLC, Houston Tex. As disclosed therein, amine-aldehyde sulfur scavenging compositions are formed contacting an aldehyde-containing-component, including for example a formaldehyde-containing-component, with an amine-containing-component the presence of an alcohol and specified conditions to produce an amine-aldehyde adduct product that does not form a solid, nor gel.

The HSS active ingredient can be diluted in water, with methanol or both. A typical triazine HSS (Sulfa Clear® 8411C) has a dilution ratio of about 50% HSS, 5% methanol, and 45% water to form the treatment solution. The solution can also act as a water-soluble corrosion inhibitor for mild steel in acidic environments. Methanol aids in freeze-protection.

The amount of HSS active ingredient is dependent on the application and the level of $H_2S$ present. For gas applications, such as to treat sour vent gas, the scavenging rate is about 0.01 to about 0.03 liters of HSS chemical per ppm $H_2S$ per thousand cubic meters of inlet solution.

Advantages of amine-aldehyde and triazine-based HSS active ingredients include that they are water soluble, can be used in gas scrubbers and continuous injection systems, are biodegradable and control $H_2S$ even in presence of $CO_2$.

With reference to FIGS. 3, 4A to 4C, in another embodiment, the vessel 12 is divided into a first and second chambers 50,52 by a barrier 54 across the interior of the closed vessel. The first chamber 50 functions to knock out moisture from the acid gas, drying the gas prior to the dried acid gas making contact with the aqueous solution. As a result of the first chamber 50, the dried acid gas is about 98% dry.

Figure 3:
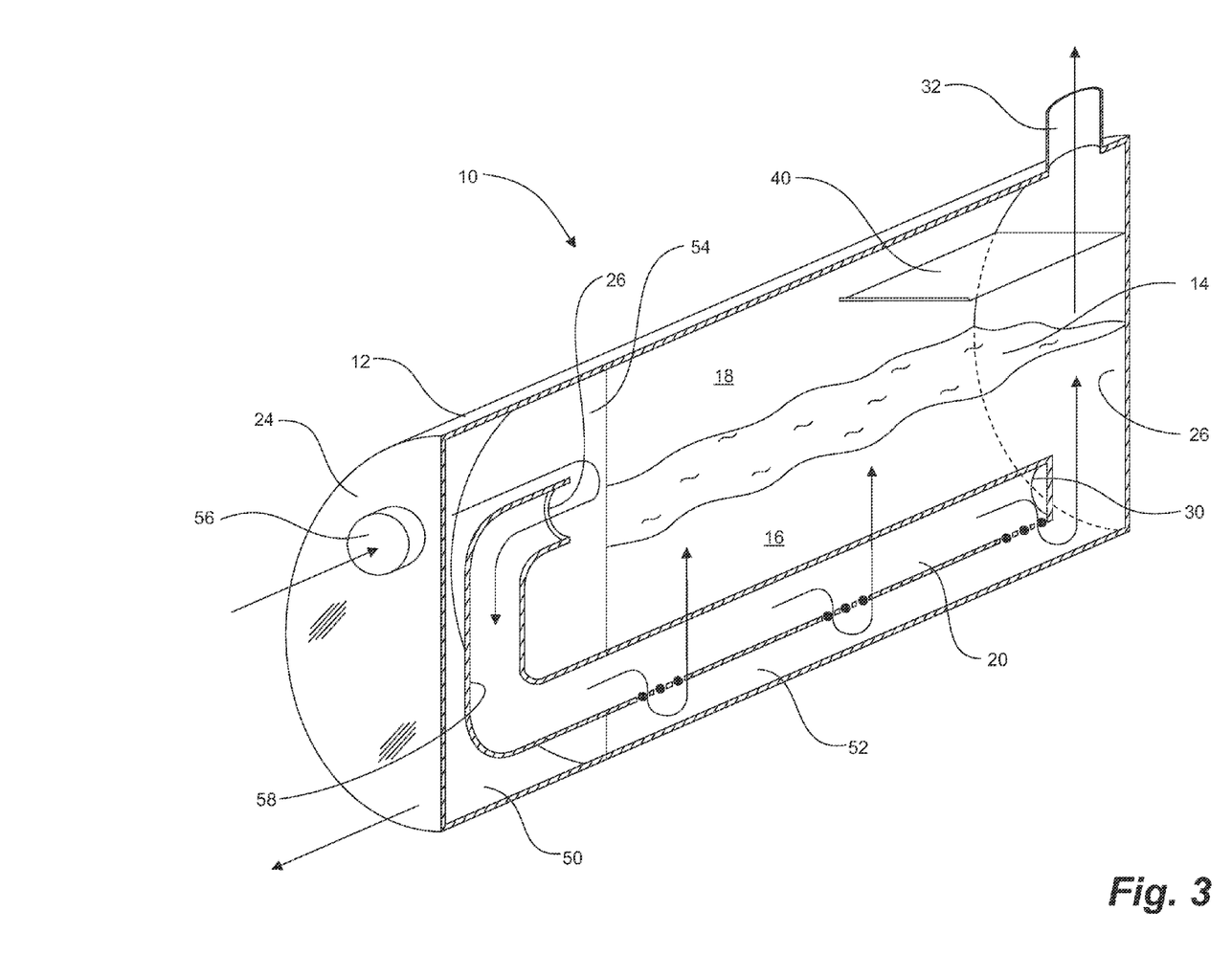
FIG. 3 is a perspective cross-sectional view of an $H_2S$ scrubber vessel according to a second embodiment.

In this embodiment, higher rates of gas flow or higher concentrations of $H_2S$ are treated, and as shown, the at least one sparge bar comprises three sparge bars 20,20,20, the number and size being related to the inlet pressure, the flow rate and the backpressure of the vessel 12.

The first chamber 50 collects any liquid that may drop out of the gas stream. A gas inlet 56 is located near the top of the vessel 12, elevated above and clear of any liquid, primarily water, to collect at the bottom of the first chamber and be subsequently drained. The second chamber 52 is partially filled with the engineered treatment solution.

The three sparge bars 20,20,20 have their inlets 26 located in the first chamber 50, isolated from the treatment solution by the barrier 54. Each inlet 26 is elevated by extension conduit 58 to an elevation above any liquid, acting as a snorkel and directing dry sour gas down the conduit 58 into the sparge bars 20. The sparge bars 20 pass sealably through the barrier 54 and extends horizontally along and spaced from bottom of the vessel to the distal end 30. The sparge bars 20 are located along the bottom of the tank to place the largest volume of the treatment solution 14 above the sparge bar 20, providing efficient contact time between the solution and the acid gas stream.

Figure 4A:
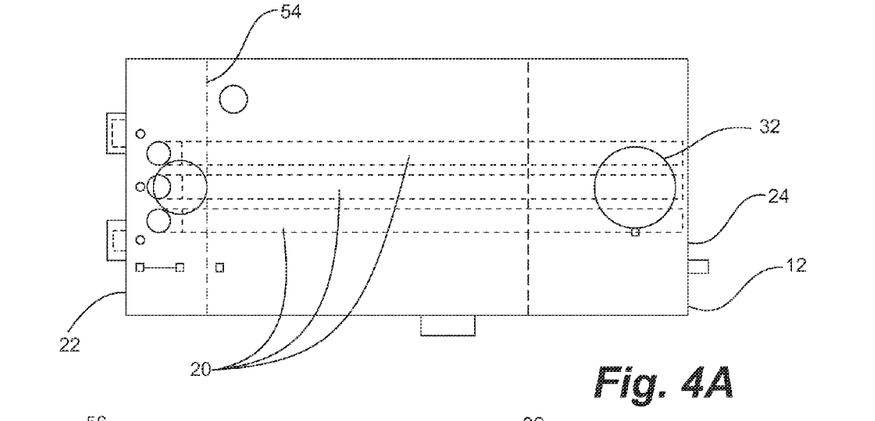
FIGS. 4A, 4B and 4C are top, side and a cross-section end view of the scrubber according to FIG. 3.
Figure 4B:
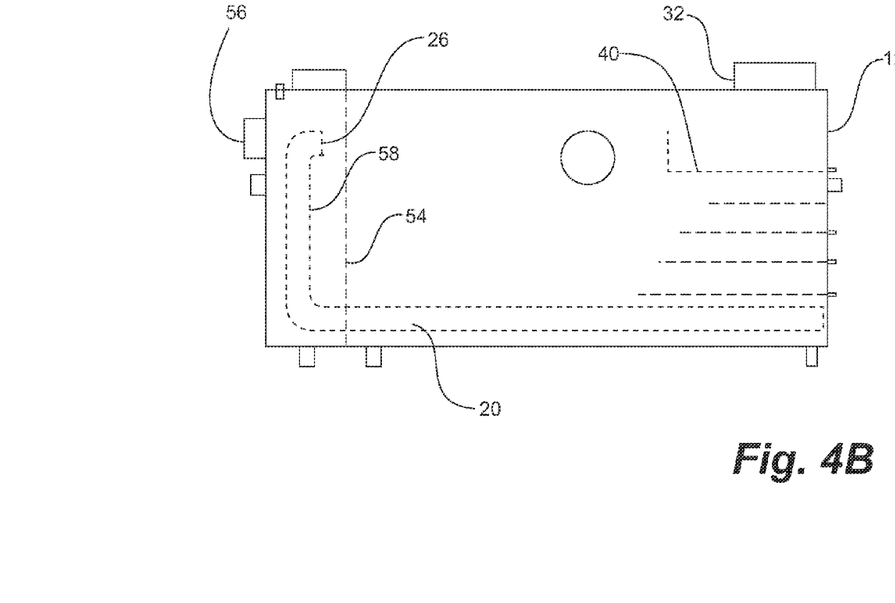
Figure 4C:
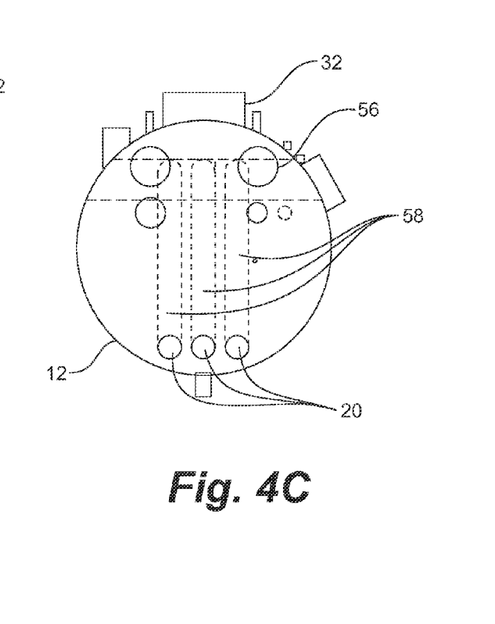
Figure 4D:
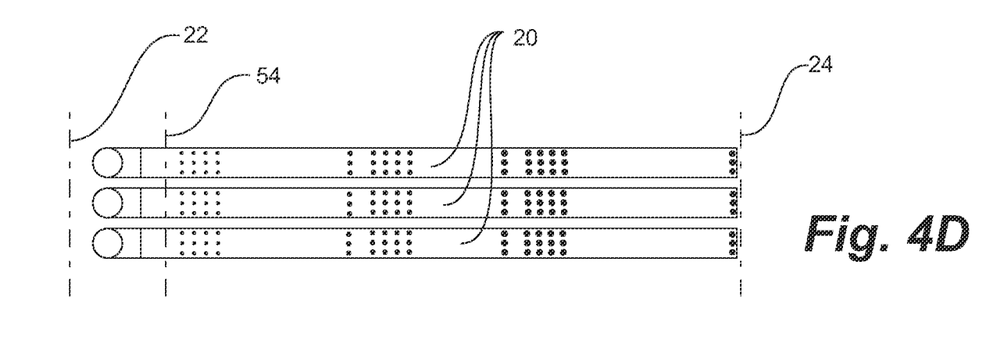
FIGS. 4D and 4E are top cross-sectional and side cross-sectional view of the sparge bars according to FIG. 3.
Figure 4E:
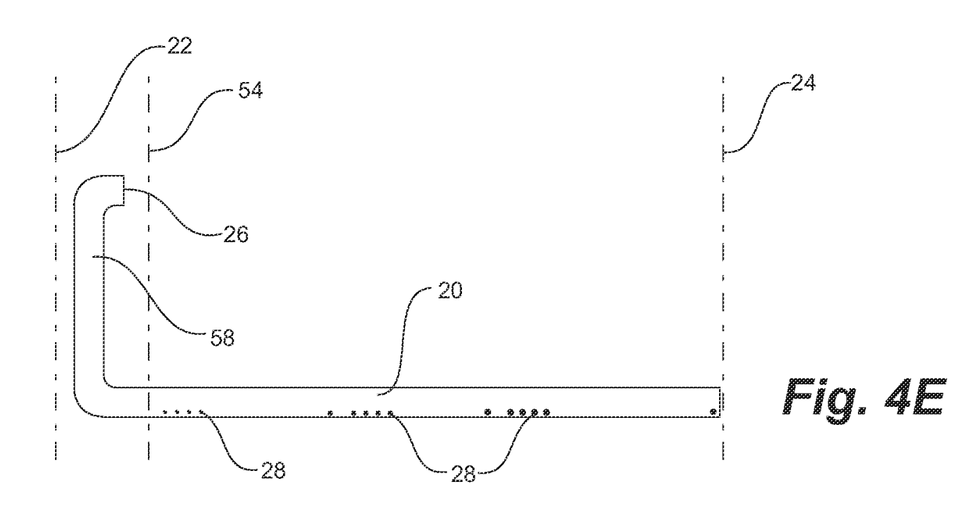

As shown in FIGS. 4D and 4E, and as stated earlier and in FIG. 2E, each of the sparge bars 20 comprises outlets 28 along the bottom of the bar 20. Referring to FIG. 4D, and in this embodiment, approximately three groupings of holes are spaced along the bar and groups of three outlets are located circumferentially about one quarter of the bar's circumference (FIG. 2E) and located at intervals along the length of the bar (FIGS. 4D, 4E). In an embodiment, the form of the groupings can be a result of manufacturing efficiency to minimize handling of the bar 20 during drilling. The outlets are arranged such that they face the bottom of the tank (FIG. 4E). The diameter of the outlets increases over the length of the sparge bars 20, where the smallest outlets start at the inlet end 26 and increase toward the distal end 30.

The scrubber system 10 is designed to use either carbon steel or, if desired, more costly 316 stainless steel. The flow rate the inlet sour gas stream can be constant or variable without any negative effect on the scrubber. Ball valves are placed on the gas inlet, as required, to ensure the desired flow for the system and maintain a pressure rating below standard atmospheric pressure.

Figure 4F:
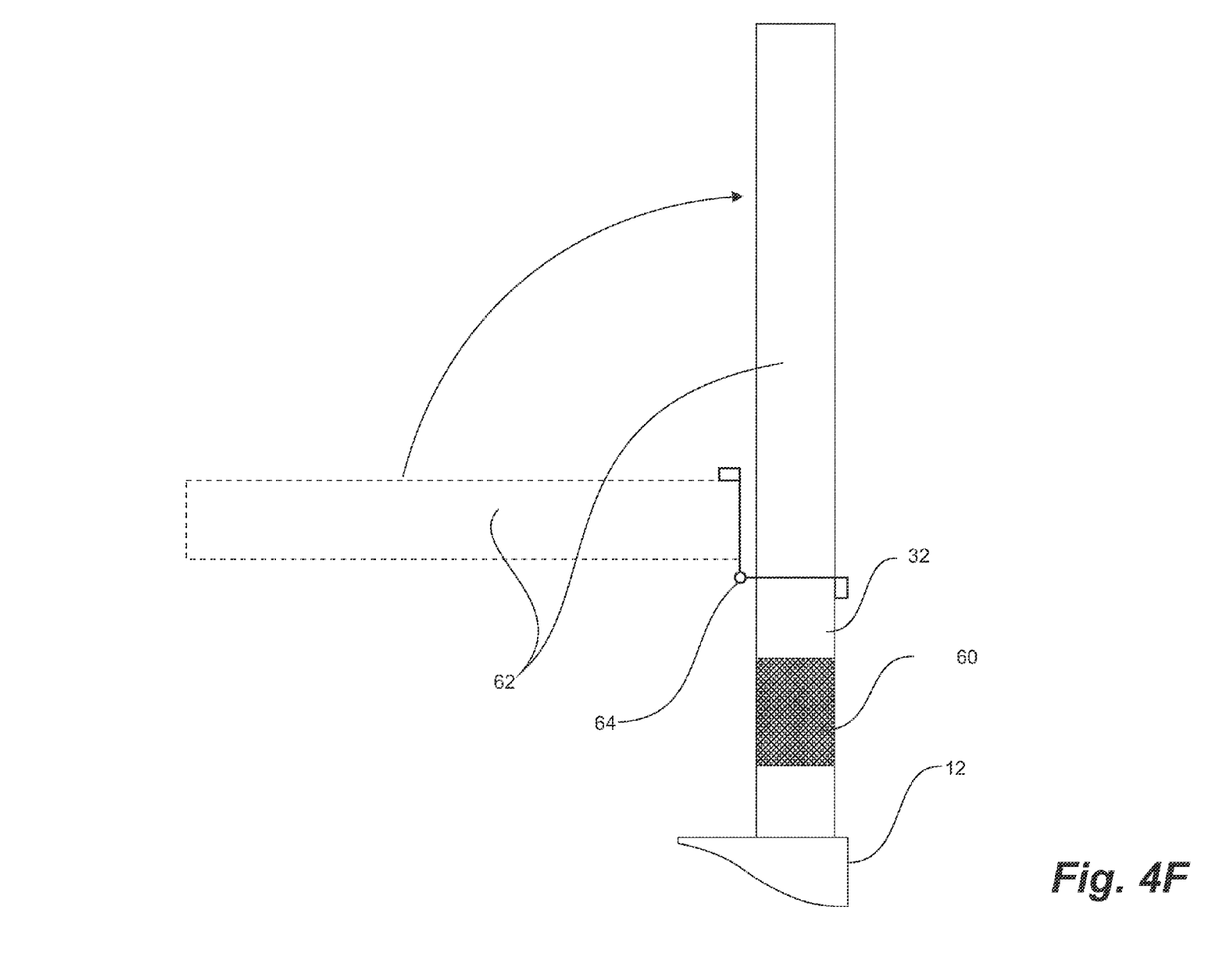
FIG. 4F is a side, cross-sectional view of a vent stack having a pivoting stack extension shown upright and in a prone position (dotted lines)

With reference to FIG. 4F, a restrictor basket 60 is placed in the gas outlet 30 of each scrubber 10 to capture any carry-over of treatment solution and to provide backpressure to enhance contact time between the acid gas and the aqueous HSS treatment solution, providing additional chemical reaction options for the elimination of volatile organic carbons as well as to disperse the outgoing sweetened gas to provide an even flow. A backpressure of about 6 to about 7 ounces is suitable. The outlet 32 further comprises a stack 62, for discharging treated natural gas. The drip tray 40 in the tank and adjacent the outlet 32 is provided for the collection of any aqueous solution that has been carried over into the stack with the outgoing gas stream, captured at the restrictor basket 60 and deposited back into the vessel 12.

As shown in FIG. 4H, the gas outlet 32 can be fit with stack 62 for removing treated natural gas. The stack may further comprise a hinge 64 for laying a portion of the stack in a horizontal position, for transport or if the stack is not required for the particular site.

The depth of the treatment solution 14 is similarly maintained for establishing a hydraulic head to provide a backpressure, but not so as to arrest flow or adversely affect upstream equipment.

Figure 5A:
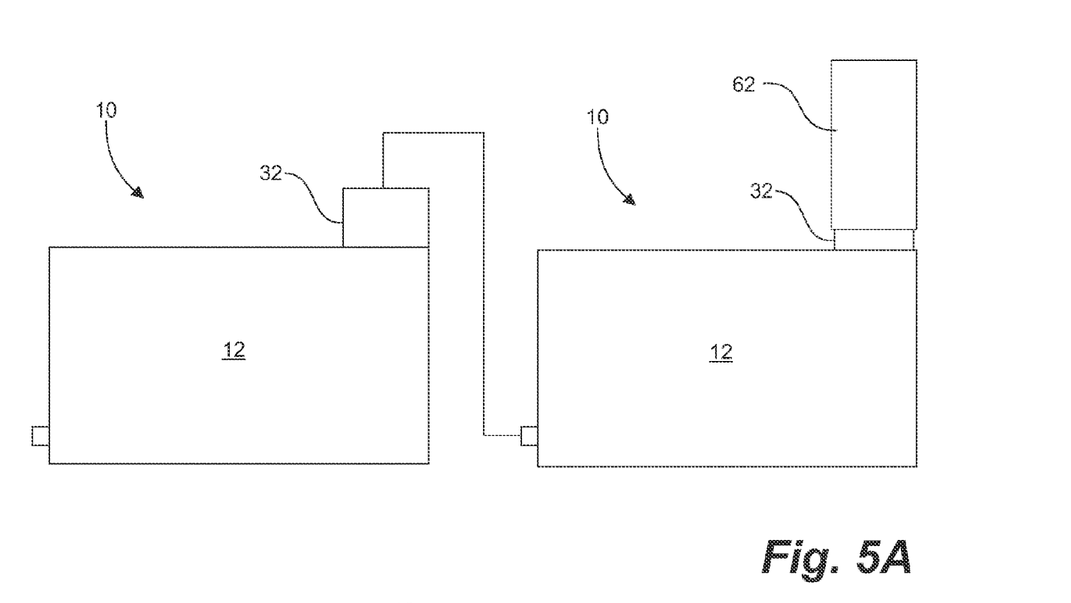
FIG. 5A illustrates a side view of two scrubbers arranged in series.

With reference to FIG. 5A, two or more scrubber vessels 12 can be operated in series so as to permit stages removal of $H_2S$, the discharge of a first scrubber 10 being directed from outlet 32 into the inlet 26 of a subsequent scrubber 10. The last of the subsequent scrubbers is fit with stack 62 or plumbed into downstream equipment.

As stated, the system can be operated in a batch manner, the treatment solution being used until the HSS active ingredient remaining is no longer effective to remove $H_2S$. The system is then taken offline to refresh the treatment solution.

Figure 5B:
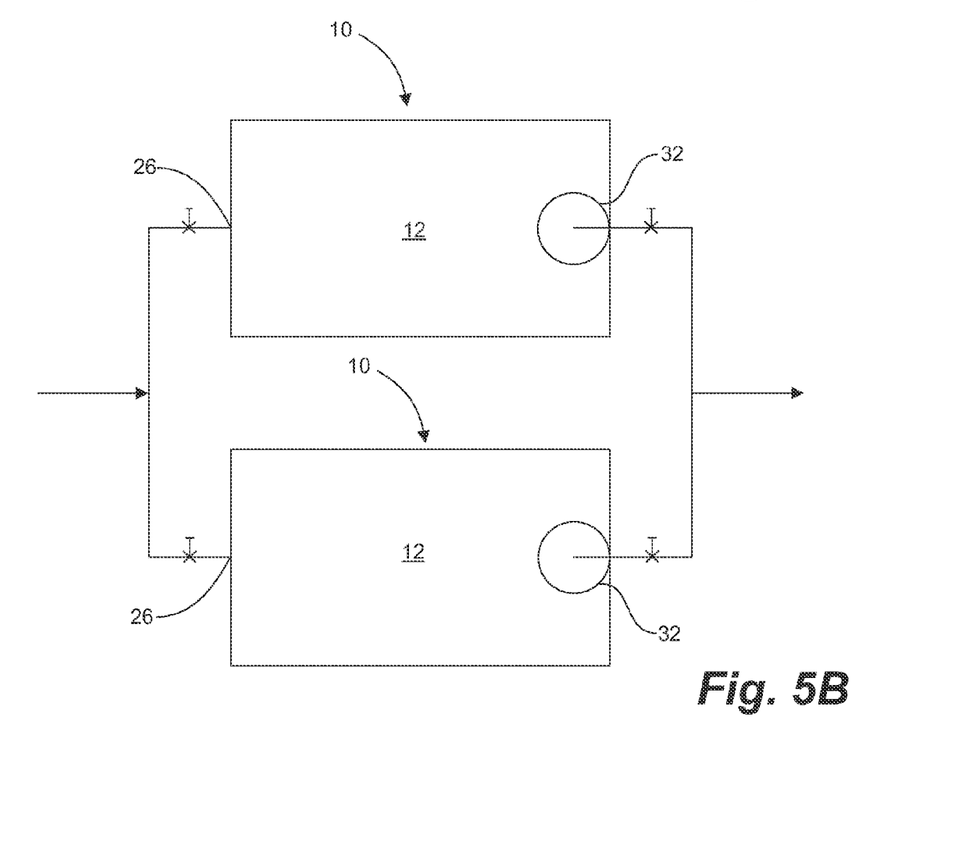
FIG. 5B illustrates a top view of two scrubbers arranged in parallel for alternate operation and servicing.

With reference to FIG. 5B, parallel vessels 12,10 or systems can be used in alternating operation to ensure continuous gas processing while one vessel 12 is offline for HSS renewal.

Figure 6:
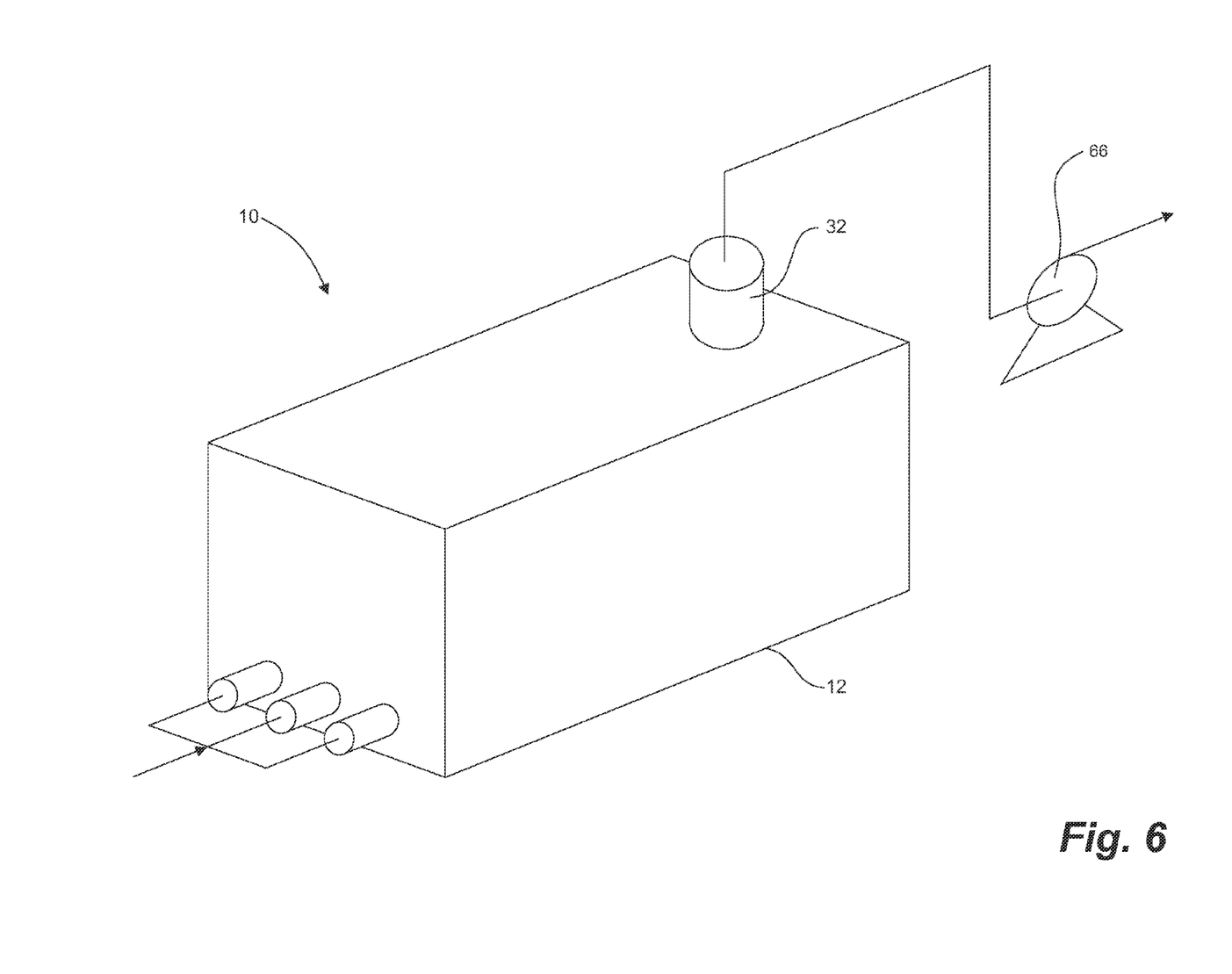
FIG. 6 is a perspective side view of an alternate rectangular scrubber and being configured for scrubbing production gas destined for downstream processing or transport.

With reference to FIG. 6 an alternate rectangular scrubber is configured for scrubbing production gas destined for downstream processing or transport. The vessel 12 discharges treated gas from gas outlet 32 to a pump 66 or other apparatus for elevating the pressure suitable for downstream equipment (not shown).

EXAMPLES

The embodiments described in the following four examples are capable of treating Acid Gas Streams (AGS), such as sour Raw Natural Gas (RNG) at flow rates ranging from approximately 400 cfm to about 12,000 cfm at common concentrations of $H_2S$ with the standard ranging from approximately 2,000 ppm to 80,000 ppm. Examples of performance parameters of various embodiments of the described scrubber are provided in Tables 1, 2 and 3 below.

With reference to FIGS. 1 and 2A through 2F, in one embodiment, scrubber vessel 12 is provided for treating a vapour stream such as Raw Natural Gas (RNG) for the removal of odorous portions of acid gases, including hydrogen sulphide and volatile organic carbons. Typically the AGS arrives for the wellhead or earlier equipment at pressures less that 5 psig.

The process is simply and conveniently operated as a batch process. Turning to FIGS. 1, 2D and 2E, a vessel 12 is a 3'-2" diameter, 6 foot long cylindrical tank of ¼" thick steel. The vessel is fit with 3½" diameter tubular sparge bar 20 that is 5'-10" long, formed of 106 carbon steel. The sparge bar 20 extends approximately the full the length of the inside of the 10 vessel terminating adjacent the vessel's second end 24. The sparge bar can have relief holes at the end to avoid accumulating stagnant solution therein. An HSS solution 14 of Sulfa Clear® 8411C has a liquid level of about 14" for a hydrostatic backpressure of about 8.5 ounces. The sparge bar 20 was completely submersed in the treatment solution 14. The vessel can accept a nominal gas flow rates of in the order of up to about 1600 cfm.

The sparge bar 20 has three sets or groupings of gas outlets 28 spaced therealong. The first set of outlets are forty-five (45) ⅛" diameter holes in 15 sets of triple drilled holes. The intermediate set of outlets comprises twenty-six (26) 3/16" holes in 12 sets of triple drilled holes. The third and last set of outlets comprises Fifty-one (51) ¼" holes in 17 sets of triple drilled holes. The sparge bar 20 is spaced about 4" from the bottom the vessel. The gas outlet 32 was a 10" diameter stack about 3' tall.

In a first example, the inlet 26 accepts an acid gas stream (AGS) of about 700 cfm at a predetermined inlet pressure being at least high enough to overcome the hydrostatic pressure of the HSS. The AGS flows into the at least one sparge bar 20 and out of the outlet holes 28 provided therein. As the AGS exits the sparge bar and traverses the HSS, the corrosive and detrimental molecules of the acid gas are removed. The treated gas flows through the gas outlet 32 whereby it can be vented to atmosphere or routed or collected in downstream equipment as a product such as a fuel source.

As shown in Tables 1 and 2 for example operations a Examples 1 and 2, inlet stream containing 2,000 ppm of $H_2S$ was treated with analysis of the gas discharging at the gas outlet 32 having 0 ppm $H_2S$.

TABLE 1

Example #1
Flow = 700 cfm; $H_2S$ Concentration = 2,000 ppm

| Time Interval Hours | Flow cfm | Inlet 26 Ppm | Outlet 32 ppm | Ambient Temp C. |
|---|---|---|---|---|
| 0 | 700 | 2000 | 0 | 20 |
| 1 | 700 | 2000 | 0 | 20 |
| 2 | 700 | 2000 | 0 | 21 |
| 4 | 700 | 2000 | 0 | 21 |

TABLE 2

Example #2

| Time Interval Hours | Flow cfm | Inlet 26 Ppm | Outlet 32 ppm | Ambient Temp C. |
|---|---|---|---|---|
| 0 | 700 | 2000 | 0 | 23 |
| 1 | 700 | 2000 | 0 | 23 |
| 2 | 700 | 2000 | 0 | 25 |
| 4 | 700 | 2000 | 0 | 28 |
| 8 | 700 | 2000 | 0 | 28 |
| 10 | 700 | 2000 | 0 | 26 |

With reference to FIGS. 3 and 4A to 4E, in a second embodiment, flow rates of 1600 cfm were tested at high $H_2S$ concentrations. In this embodiment, the scrubber 10 utilizes the same sized vessel 12 as in the first embodiment, being 3'-2" diameter by 6 feet long. In this embodiment, the vessel was fit with three, 3½" diameter tubular sparge bars 20. Again, the treatment solution 14 had a liquid level of about 14" for a hydrostatic backpressure of about 8.5 ounces. The three sparge bars 20,20,20 were completely submersed in the treatment solution 14. The sparge bar 20 has three sets or groupings of gas outlets 28 as was the case of the single bar of the 700 cfm examples.

In Examples 3 and 4, the inlet 26 received 1,600 cfm of AGS at a predetermined inlet pressure. The AGS flowed into the first chamber 50 of the vessel 12 where liquids, such as entrained water, suspended in the AGS, separated from the gas stream and collected in a sump at the bottom of the first chamber 50. The chamber was periodically drained. The dry AGS entered the elevated inlets 26 of the snorkels 58 of the three sparge bars and flowed into the second chamber 52, traversing the HSS solution 14 for removal of noxious components. The treated gas flows through the gas outlet 32.

As shown in Tables 3 and 4 for operations in Examples 3 and 4, inlet stream containing 60,000 and 80,000 ppm of $H_2S$ respectively was treated, with analysis of the gas discharging at the gas outlet 32 having between 0 and 5 ppm $H_2S$.

Example #3

Flow=1,600 cfm; $H_2S$ Concentration=60,000

| Time Interval Hours | Flow Cfm | Inlet 26 ppm | Outlet 32 ppm | Ambient Temp C. |
|---|---|---|---|---|
| 0 | 1600 | 60000 | 0 | 18 |
| 1 | 1600 | 60000 | 2 | 18 |
| 2 | 1600 | 60000 | 2 | 18 |
| 4 | 1600 | 60000 | 3 | 18 |
| 8 | 1600 | 60000 | 5 | 18 |

Example #4

Flow=1,600 cfm; $H_2S$ Concentration=80,000

Example #4

| Time Interval Hours | Flow Cfm | Inlet 26 ppm | Outlet 32 ppm | Ambient Temp C. |
|---|---|---|---|---|
| 0 | 1600 | 80000 | 0 | 24 |
| 1 | 1600 | 80000 | 0 | 24 |
| 2 | 1600 | 80000 | 0 | 26 |
| 4 | 1600 | 80000 | 1 | 26 |
| 8 | 1600 | 80000 | 4 | 25 |

As shown in FIG. 6, and in a fifth example, a high capacity, yet portable vessel 12 that has a size that still fits within transport requirements and limits is a 10' by 10' by 16' long square vessel 12 capable of treating gas rates in the order of about 11,000 cfm.

The embodiments of the invention for which an exclusive property or privilege is claimed are defined follows:

1. A scrubber for removing at least hydrogen sulphide ($H_2S$) from a gas stream comprising:
   a closed vessel containing a liquid level of an aqueous $H_2S$ scavenging solution including an active $H_2S$ scavenging ingredient and forming a headspace thereabove at about atmospheric pressure;
   at least one sparge bar for receiving the gas stream and distributing the gas stream into the $H_2S$ scavenging solution through graduated opening, each opening or group of openings having an outlet area of which increases from a first small upstream area to a larger downstream area as the gas stream is incrementally discharged into the $H_2S$ scavenging solution, and percolating the gas stream through the $H_2S$ scavenging solution and into the headspace for removal of at least the $H_2S$ and forming a treated discharge stream; and a gas outlet from the headspace for collecting the treated discharge stream.

2. The scrubber of claim 1 wherein the at least one sparge bar is two or more sparge bars extending parallel and laterally spaced relation.

3. The scrubber of claim 1 wherein the gas outlet is fit with a restrictor for creating a backpressure in the vessel.

4. The scrubber of claim 1 further comprising:
one or more subsequent closed vessels scrubbers arranged in series; and
a connector for communicating the treated discharge gas from a prior vessel to the inlet of the subsequent vessel.

5. The scrubber of claim 1 further comprising:
one or more additional closed vessels scrubbers arranged in parallel for alternate in service operation and offline servicing to replace the $H_2S$ scavenging solution.

6. The scrubber of claim 1 wherein the $H_2S$ scavenging solution is a triazine.

7. The scrubber of claim 6 wherein the $H_2S$ scavenging solution solution of a triazine selected from the group consisting of: hexahydro-1,3,5-tris(2-hydroxyethyl)-s-Triazine; tris (hydroxylmethyl) nitromethane; a mixture of 4-(2-nitrobutyl)morpholine and 4,4'-(2-ethyl-2-nitrotrimethylene)-dimorpholine; a mixture of 4,4-dimethyloxazolidine and 3,4,4-trimethyloxazolidine; hexahydro-1,3,5-triethyl-s-triazine; a mixture of sodium 2-pyridinethiol-1-oxide and hexahydro-1,3,5-tris(2-hydroxyethyl)-s-triazine; 2,2-dibromo-3-nitrilo-propionamide; methanol [[[2-(dihydro-5-methyl-3(2H)-oxazolyl)-1-methylethyoxy]methoxy]methoxy]; 2 [(hydroxymethyl)amino]ethanol; 2 [(hydroxymethyl)amino]-2-methyl-propanol; sodium dichloro-s-triazinetrione dihydrate; or 1-(hydroxymethyl)-5,5 dimethylhydantoin.

8. The scrubber of claim 1 wherein the $H_2S$ scavenging solution is an aqueous solution of a non-solid, non-gel aldehyde-amine adduct product from the reaction of an aldehyde and an primary or secondary amine in the presence of a liner or branched alcohol.

9. The scrubber of claim 1 wherein the vessel is a cylindrical tank.

10. The scrubber of claim 1 wherein the vessel has a diameter within transport requirements.

11. The scrubber of claim 1 wherein the vessel is a rectangular tank.

12. The scrubber of claim 11 wherein the vessel is within transport requirements.

* * * * *